United States Patent [19]

Grinberg et al.

[11] 4,443,064
[45] * Apr. 17, 1984

[54] HIGH RESOLUTION AC SILICON MOS-LIGHT-VALVE SUBSTRATE

[75] Inventors: Jan Grinberg, Los Angeles; Michael Waldner, Woodland Hills; Paul O. Braatz, Los Angeles; Alexander D. Jacobson, Topanga, all of Calif.

[73] Assignee: Hughes Aircraft Company, El Segundo, Calif.

[*] Notice: The portion of the term of this patent subsequent to Dec. 16, 1997 has been disclaimed.

[21] Appl. No.: 214,930

[22] Filed: Dec. 10, 1980

Related U.S. Application Data

[63] Continuation of Ser. No. 99,381, Nov. 30, 1979, Pat. No. 4,239,348, which is a continuation of Ser. No. 967,444, Dec. 7, 1978, abandoned, which is a continuation of Ser. No. 834,856, Sep. 19, 1977, abandoned.

[51] Int. Cl.³ .............................................. G02F 1/13
[52] U.S. Cl. ................................... 350/334; 350/332; 350/342; 350/339 R; 357/24
[58] Field of Search .................. 350/332, 334, 339 R, 350/342; 307/221 D; 357/24

[56] References Cited

U.S. PATENT DOCUMENTS 3,976,361 8/1976 Fraas et al. .......................... 350/342
4,227,201 10/1980 Grinberg et al. ................ 350/342 X
4,239,348 12/1980 Grinberg et al. .................. 350/342

Primary Examiner—John K. Corbin
Assistant Examiner—Richard F. Gallivan
Attorney, Agent, or Firm—Gerald B. Rosenberg; David W. Collins; Anthony W. Karambelas

[57] ABSTRACT

There is disclosed a single crystal silicon charge storage apparatus suitable for use in an alternating current driven liquid crystal light valve having therein a moderately doped microchannel stop grid. The charge storage medium is made of a high resistivity substrate on which an MOS capacitor is formed having fast photoelectric transient response and capable of operating over a wide frequency range. A doped microgrid structure is formed in one side of the substrate to prevent charge carrier spreading at the silicon-silicon dioxide interface and to provide a focusing electric field for the charge carriers. The signal from the substrate is electrically coupled through high-reflectivity mirrors and light blocking layers to the liquid crystal.

8 Claims, 8 Drawing Figures

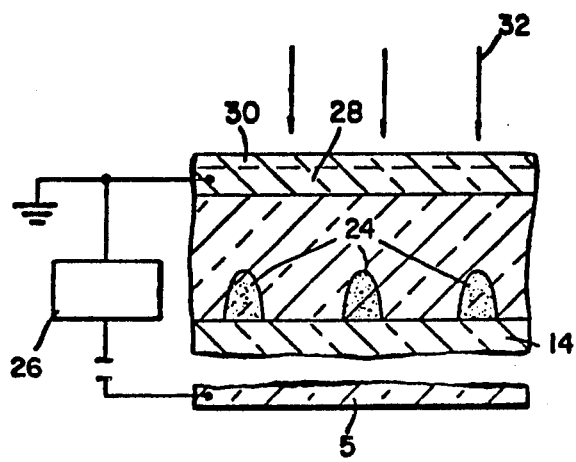
Fig. 3.
Fig. 4.
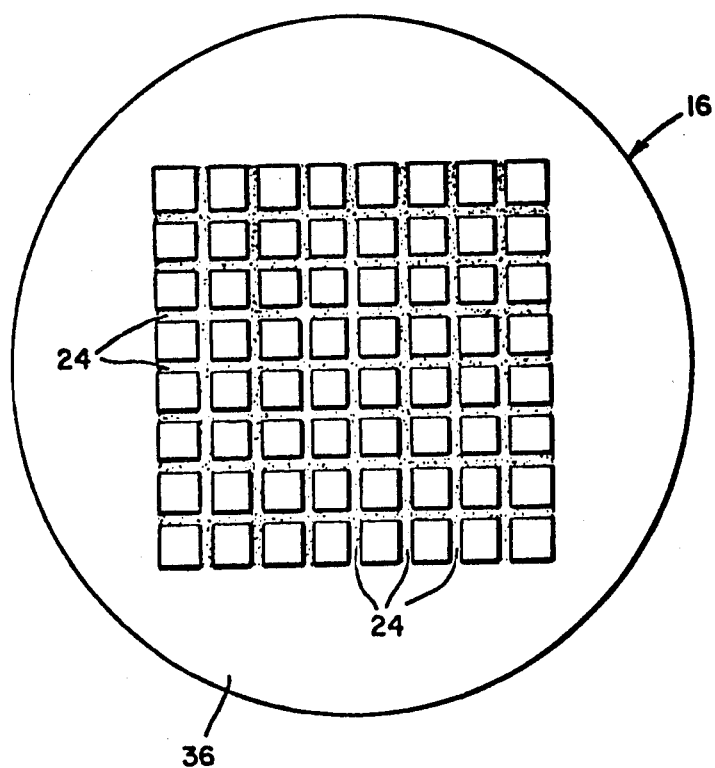

HIGH RESOLUTION AC SILICON MOS-LIGHT-VALVE SUBSTRATE

This is a continuation of application Ser. No. 099,381 filed Nov. 30, 1979, now U.S. Pat. No. 4,239,348 which in turn is a continuation of Ser. No. 967,444 filed Dec. 7, 1978 which is a continuation of Ser. No. 834,856 filed Sep. 19, 1977, the latter two both abandoned.

FIELD OF THE INVENTION

This invention relates to a charge storage and transfer apparatus and more particularly to an MOS capacitor type structure for the storage and transfer of photogenerated minority carriers representing signals to an alternating current driven liquid crystal light valve.

RELATED APPLICATIONS

In a copending U.S. Pat. application Ser. No. 792,842 filed on May 2, 1977. now abandoned, entitled "High Resolution Continuously Distributed Silicon Photodiode Substrate" by Grinberg et al and assigned to the present assignee, there is disclosed and generically claimed a semiconductor apparatus for the transfer of charge from one surface of a substrate to the opposite through the use of a space charge depletion region.

In another copending U.S. Pat. application Ser. No. 796,641 filed on May 13, 1977 entitled "Simple CCD Readout Scheme for Display Applications", now U.S. Pat. No. 4,227,201 by Grinberg et al and assigned to the present assignee, there is disclosed and generically claimed a semiconductor apparatus for the transfer of charge from one surface of a substrate to the opposite through the use of a charge depletion region wherein the charge packets are initially stored under a set of CCD electrodes overlying an epitaxial layer formed on a surface of the substrate and then they are simultaneously transferred across the entire thickness of the substrate.

In another copending U.S. Pat. Application Ser. No. 808,224, filed on June 30, 1977, entitled "Continuous Silicon Mos Ac Light Valve Substrate", now U.S. Pat. No. 4,191,454, by Braatz et al, there is disclosed and generically claimed a semiconductor apparatus for the transfer of charge under the influence of an AC electric field, across a substrate which is depleted of its mobile charge carriers during one portion of the AC bias cycle.

BACKGROUND OF THE INVENTION

U.S. Pat. No. 3,824,002 issued to Terry D. Beard entitled "Alternating Current Liquid Crystal Light Valve" and assigned to the present assignee discloses the basic principles of operation of an alternating current liquid crystal light valve which requires that a photoconductor be impedance-matched to the liquid crystal, the photocapacitance of the photoconductor being modulated in response to an input light.

U.S. Pat. No. 3,976,361 issued to Fraas et al entitled "Charge Storage Diode with Graded Defect Density Photocapacitive Layer" and assigned to the present assignee discloses a different photoconductor for a similar light valve. the photoconductor consists of a charge storage semiconductor diode with a graded band gap layer increasing the optical absorption coefficient of the region near the rectifying junction to permit the storage of charge.

U.S. Pat. Application Ser. No. 691,652, filed on June 1, 1976, by Grinberg et al entitled "Silicon Single Crystal Charge Storage Diode" and assigned to the present assignee describes a species of the generic invention of U.S. Pat. No. 3,976,361.

This invention presently stands allowed and will issue in due course. It discloses a charge storage photodiode silicon substrate which is doped with a slow recombination center element, such as silver, to combine the advantages of a highly developed silicon manufacturing technology with a high liquid crystal stability under AC operating conditions.

The aforementioned copending U.S. Pat. application Ser. No. 792,842 filed on May 2, 1977, discloses the use of a space charge depletion region to transfer field guided minority charge carriers representing signals from one surface of a substrate to the opposite using the depletion region as a transfer medium. The charges are DC driven and the depletion region in one embodiment is formed by reverse biasing a rectifying junction. As it was indicated in that application, minority carriers representing signals can be generated or injected into the storage and transfer medium through a variety of different means. One such means, that was disclosed in that application, was the photogeneration of charge carriers inside the transfer medium. One application of the concept dislcosed and claimed in the aforementioned patent application is in DC liquid crystal light valves.

The aforementioned copending U.S. Pat. application Ser. No. 796,641 filed on May 13, 1977 disclcoses and claims a structure wherein a CCD input register is used to accept and store the input charge and then transfer it out to activate a light display medium such as the liquid crystal. The charge packets, after their release from the control of the CCD control voltages, diffuse through a thin epitaxial layer and reach a relatively thick space charge depletion region through which they transfer under the influence of an electric field to the opposite side of the substrate. Such a structure can be used as a charge transfer medium for a DC liquid crystal light valve.

Some of the present photoactivated liquid crystal light valves, made according to the teachings of U.S. Pat. No. 3,976,361 use a thin film of cadmium sulphide which is driven with alternating current. The photodetector acts as a light activated voltage gate. The thin film structure is designed to accept the major portion of the drive voltage when the photoconductor is unilluminated; the portion of the voltage that falls across the liquid crystal is below the threshold for activation of the liquid crystal electro-optic effect. When light falls on the photoconductor, its impedance drops, thereby switching the voltage from the photoconductor onto the liquid crystal and driving the liquid crystal into its activated state. Due to the high lateral impedance of the thin films, there is very little spread of the photogenerated signal and of its concomitant liquid crystal electro-optic effect. As a result, the light activation process is a high resolution process, so that the device can accept photographic quality images for transfer to an intense beam of light.

The aforementioned copending U.S. Pat. application Ser. No. 808,224 filed on June 20, 1977, discloses the use of a single crystal high resistivity substrate which is photosensitive under AC excitation to generate charge and then transfer it under the influence of an AC electric field across the substrate which is depicted of its mobile charge carriers during one portion of the AC bias cycle. The means for depleting the substrate of its mobile charge carriers during a part of the bias cycle is an MOS capacitor formed on a surface of the substrate. The transverse and spatially uniform electric field of the totally depleted MOS capacitor is used to collect photogenerated minority carriers and to provide a spatial resolution by means of field focusing during the depletion phase of the applied AC voltage.

The inventions disclosed and claimed in the aforementioned patent aplications and patents represent truly significant advances in this art as explained in detail in said application. Our present invention extends the developments in this area of technology and has many further advantages and flexibilities. For example, high yield and compatibility with existing conventional processes, a fast photoelectric transient response, a wide range of photosensitivity and permits an AC operation over a wide frequency range which provides a greatly increased liquid crystal electrochemical stability.

THE INVENTION

The general purpose of this invention is to provide an alternating current liquid crystal light valve with an improved signal charge readout structure. More specifically, it provides a structure which can be photoactivated or receive signal representing charge carriers from a CCD or any other source and convert it into an AC signal that will activate the liquid crystal. Signals are transferred from one side of a substrate to the other with a high collection efficiency and with good spatial resolution.

To accomplish this purpose we have provided an alternating current driven liquid crystal light valve which includes in combination an AC activated liquid crystal layer, interface means next to the liquid crystal layer for optically isolating it from the remaining portion of the structure and a light valve substrate. The light valve substrate includes a dielectric layer which is adjacent the interface means and a semiconductor body of predetermined thickness and conductivity adjacent the dielectric layer. There are also provided means for applying across the light valve substrate an AC biasing electric field which depletes the semiconductor body of mobile charge carriers during a portion of the AC cycle whereby signal representing charge carriers in the semiconductor body transfer when it is depleted of mobile charge carriers under the influence of the electric field. There are also provided means in the semiconductor body for focusing the signal representing charge carriers for the improved spatial resolution of the signal.

The semiconductor body can be silicon with a high resistivity so that it can be fully depleted of its mobile charge carriers with a relatively low voltage. The dielectric layer can then be silicon dioxide thus forming in combination with the silicon body an MOS type capacitor. An electric field of the totally depleted MOS structure is used to collect photogenerated minority carriers or minority charge carriers read out of an adjacent CCD or from any other source. A spatial resolution is provided by means of field focusing during the depletion phase of the applied AC voltage and by additional focusing means which can take the form of a microgrid in the semiconductor body. A microgrid as used in this specification refers to a structure such as a micro channel grid which in normal operation during the depletion part of the cycle is fully depleted of mobile charge carriers just like the adjacent higher resistivity bulk silicon substrate. This microgrid which when depleted has a higher concentration of immobile charge carriers than the remaining adjacent part of the substrate (because of its higher impurity density) performs the focusing function by repelling the signal carriers towards the center of the cell.

One advantage of the present invention is that it uses a depleted semiconductor body to move a signal representing charge carriers to a liquid crystal or some other light modulated display medium. Inside the charge depleted substrate, the charge carriers are field guided and, therefore, move while maintaining their spatial resolution.

Another advantage is that it uses a microgrid in the semiconductor body to focus the charge carriers and improve the spatial resolution.

Another advantage of the present invention is that the light valve is AC driven which result in an improved electrochemical stability for the liquid crystal.

Accordingly, it is an object of the present invention to provide an AC liquid crystal light valve with an improved charge readout structure for the generation and transfer of signal representing charge carriers to a liquid crystal.

It is another object of the present invention to provide an AC liquid crystal light valve which includes a charge transfer medium that can be used to transfer many signals at high frequencies while maintaining their spatial resolution.

It is another object of the present invention to provide a light valve with a charge focusing grid in the transfer medium to improve the resolution of the transmitted signals.

It is yet another object of the present invention to provide an AC liquid crystal light valve with a wide spectral range of photosensitivity.

These and other objects of the invention will become more fully apparent in the following description of the accompanying drawings.

BRIEF DESCRIPTION OF THE DRAWINGS

FIG. 3 is a diagrammatic cross-sectional view of a portion of a photoactivated liquid crystal light valve that includes a light valve substrate that can be reached by a light input.

FIG. 4 is a diagrammatic top view of the focusing grid on a liquid crystal light valve array.

DETAILED DESCRIPTION OF THE DRAWINGS

Figure 1:
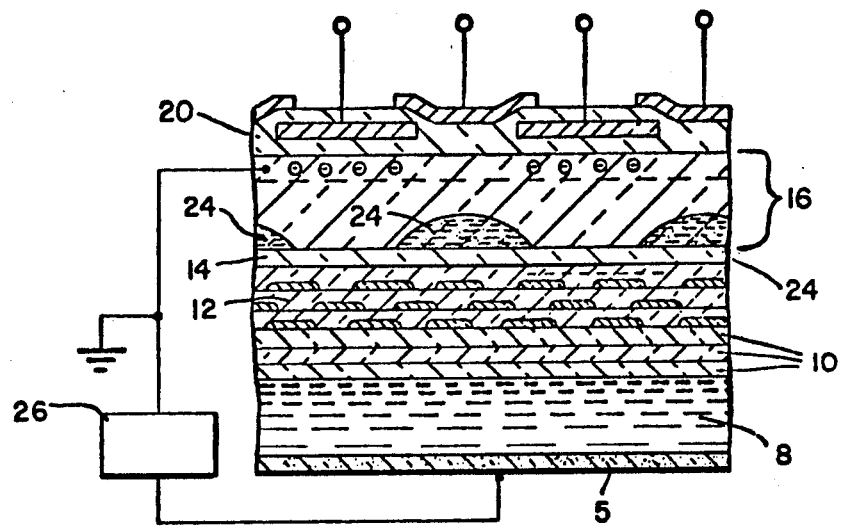
FIG. 1 is diagrammatic cross-sectional view of a CCD driven MOS silicon liquid crystal light valve with a microgrid constructed in accordance with the present invention.

Referring now to FIG. 1, there is shown a diagrammatic cross-sectional view of a CCD driven liquid crystal light valve. It receives a dc signal from the CCD and converts it into an AC signal (zero average charge) that activates the liquid crystal. It includes a transparent electrode 5, a liquid crystal layer 8, a multilayer mirror 10, a light blocking layer 12, a silicon dioxide layer (SiO$_2$) 14, a high resistivity silicon (Si) wafer 16, a silicon epitaxial layer 18, a silicon dioxide layer 20, and a set of CCD electrodes 22. The combination of the multilayer mirror 10 and the light blocking layer 12 make up an interface means for the optical isolation of the liquid crystal from the light valve substrate and the CCD. In the high resistivity silicon 16, or silicon substrate as sometimes is referred to there is a microgrid structure 24 which is provided for the focusing of the signal charge carriers. This microgrid structure defines cell areas 42. Although this structure will be described with a P type silicon substrate, the invention is equally applicable with devices constructed with N type silicon substrates or substrates from other semiconductor materials using any type of conductivity determining impurity. In one particular example, the silicon substrate was P type with a <100> crystalographic orientation. The resistivity of the substrate can vary although for better resolution it would be preferable to be over 1 kΩ-cm. Since this is a high resistivity P type material it is sometimes referred to as $\pi$-type Si. An AC power supply 26 is applied between transparent electrode 5 and the epitaxial layer 18.

During operation a CCD input register accepts serial input data, stores it and reformats it in subsequent parallel processing. This is done, for example, by having the CCD serial input register accept one line of information and after it is filled, the information is transferred in parallel into a CCD parallel array. Next the serial register is filled with a new line of information while the first line of information is being shifted one step upward in the parallel array. Then the second line of information is transferred from the serial register into the first stage of the parallel array. The same process is repeated until the parallel array contains an entire frame of information. Then the entire frame of information is transferred simultaneously through the readout structure for a temporary storage into the liquid crystal layer where it is used to spatially modulate a laser readout beam. The readout structure operates in an AC mode using an insulating SiO$_2$ layer to prevent any dc current component from flowing through the structure. So this readout structure electrically functions like an MOS capacitor. The voltage waveform applied to this capacitor is preselected so that most of the time (as is shown in FIG. 5 discussed at a later section) the SiO$_2$ side 14 is biased positively with respect to the grounded epitaxial layer 18. For the remaining portion of the cycle the SiO$_2$ layer 14 is grounded. The power supply frequency is preselected to be the same as the frame frequency. During the positive part of the cycle the $\pi$ region 16 is fully depleted and so is the microgrid structure 24. The depletion region also penetrates into a small portion of the epitaxial layer 18, with this penetration being deeper in the region between the microgrid regions. The regions of the microgrid act like buckets of immobile negative charge which repel the signal electrons. Therefore, the microgrid acts as a focusing grid to force the electrons toward the center of the region between the doped regions. Charge carriers that are released from the control of the CCD electrodes diffuse into a portion of the epitaxial layer and they are then swept by the electric field across the depleted portion of the epitaxial layer, the entire thickness of the $\pi$-type substrate and reach the Si–SiO$_2$ interface in the regions between the microgrid. Therefore, the presence of this charge changes the voltage drop across the liquid crystal, thus activating it. The charge carriers are stored at the SiO$_2$/Si interface region between the microgrid until the bias on the SiO$_2$ layer disappears which results in a collapse of the depletion region, at which time the excess minority carriers (which are electrons in this case) diffuse into the $\pi$ region, where they recombine during the course of the remaining portion of the bias cycle.

Figure 2:
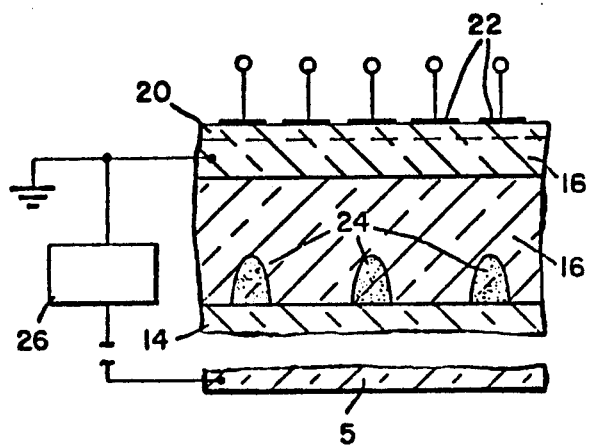
FIG. 2 is a diagrammatic cross-sectional view of a portion of the light valve shown in FIG. 1, that includes the light valve substrate with the CCD that provides the activating input signals.

Referring now to FIG. 2, there is shown a diagrammatic cross-sectional view of a portion of the light valve shown in FIG. 1, that includes the light valve substrate with a CCD structure that provides the activating input signals. It includes a high resistivity $\pi$ type Si wafer 16 with an SiO$_2$ layer 14 on one side and a P type Si epitaxial layer 18 on the other. Next to the epitaxial layer 18 there is an SiO$_2$ layer 22 on which there are CCD electrodes 22. A power supply 26 is connected across the epitaxial layer 18 and a transparent electrode 5.

Referring now to FIG. 3, there is shown a diagrammatic cross-sectional view of a portion of a light valve that is photoactivated. It includes a high resistivity $\pi$ type silicon substrate 16 on one side of which there is an SiO$_2$ layer 14 and in the substrate adjacent the SiO$_2$ layer there is microgrid 24. On the other side of the substrate there is a transparent electrode 28 which is formed by the heavy doping (P+ region) of a relatively thin portion of the substrate with a P type impurity and adjacent to electrode 28 there is thin transparent SiO$_2$ layer 30. A power supply 26 is connected between transparent electrode 5 and transparent electrode 28. Writing light 32 penetrates through the SiO$_2$ and P+ layers 30 and 28 respectively and reaches to the $\pi$ type silicon substrate 16 which is sensitive to received radiation. In all other respect the operation of a photoactivated liquid crystal light valve is similar to the CCD drive liquid crystal light valve.

Referring now to FIG. 4, there is shown a diagrammatic top view of a wafer for a liquid crystal light valve display with emphasis on the relative position of the microgrid regions or microchannel stops as they are sometimes referred to. A moderately doped grid structure 24 is formed in a silicon wafer 16 to define an array of resolution cells 42 which are $\pi$ type silicon. A P+ channel stop 38 provides a type of field isolation. The microchannel grid 24 is formed either by ion implantation or diffusion and has a smooth surface for good liquid crystal alignment. The doping level and the depth of the grid are such that it is depleted during normal operating conditions. Since the grid is like buckets of immobile negative charge that repel electrons the transferred electrons are focused to the center of the cell.

Figure 5A:
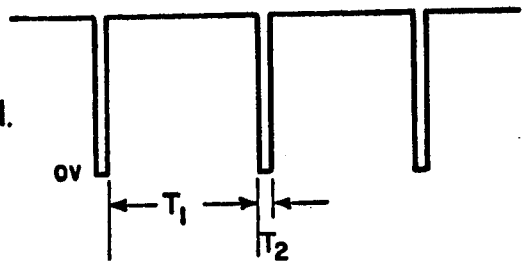
FIGS. 5a-5d are waveforms representing the voltage bias supplies, the current through the liquid crystal layer, the liquid crystal equivalent circuit and the voltage across the liquid crystal layer.
Figure 5B:
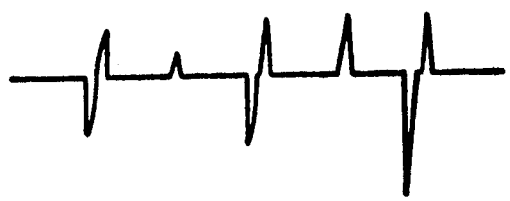
Figure 5C:
Figure 5D:
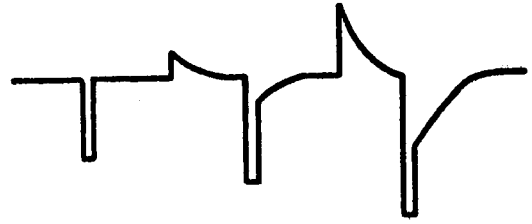

Referring now to FIGS. 5a–5d there are shown voltage and current waveforms and an equivalent circuit that illustrate the operation of a light valve constructed in accordance with this invention. In FIG. 5a there is shown a power supply waveform applied by power supply 26 of FIG. 1. The voltage is 0 during time T$_2$ (accumulation phase) and V (typically 50–100 volts) during time T$_1$ (depletion phase). T$_1$ is selected to be much larger than T$_2$. The liquid crystal current is proportional to the derivative of the voltage and has a waveform as shown in FIG. 5b. The current pulses located between the power supply pulses are the signal pulses. Assuming that the liquid crystal layer 8 has an electrical equivalent circuit as shown in FIG. 5c with an RC constant approximately equal to 5 MSeC and assuming that T$_2$ is 5 MSeC, they the voltage across the liquid crystal has the form presented in FIG. 5d.

The equivalent circuits of the other different layers including the interface layers and their effect on the operation on general AC coupled liquid crystal light valves has been explained in the specification of the aforementioned copending U.S. Pat. application Ser. No. 808,224 by the same inventors as the present application and those explanations are hereby incorporated into this application by reference.

While the invention has been described with preferred embodiments and test structures, it will be understood that the invention is not limited to those particular embodiments and structures. On the contrary, it is intended to cover all alternatives, modifications and equivalents, as may be included within the spirit and scope of the invention as defined by the appended claims.

What is claimed is:

1. A liquid crystal light valve adapted to be driven by a bias voltage alternating between two preselected levels for responding to applied information signals, said light valve including in combination:
   (a) a liquid crystal layer;
   (b) interface means adjacent said liquid crystal layer for reflecting light and inhibiting its passage therethrough;
   (c) a light valve substrate structure including a dielectric layer adjacent said interface means and a semiconductor body of predetermined thickness and a first conductivity type and first impurity level adjacent said dielectric layer;
   (d) means for applying across said light valve substrate a bias voltage alternating between two preselected levels which depletes said semiconductor body of mobile charge carriers during a portion of the bias cycle whereby a charge depleted region and an electric field are established in said region through which signal representing charge carriers of a second conductivity type in said semiconductor body transfer while said body is depleted of mobile charge carriers under the influence of said electric field; and
   (e) a microgrid structure in said semiconductor body comprised of a mesh of intersecting doped regions of said first conductivity type, each of said regions being of a second impurity level, said second level being greater than said first level so that, when said semiconductor body and microgrid are depleted of mobile charge carriers of the first conductivity type, said intersection regions of said microgrid provide a configuration of immobile charge of said second conductivity type to repel said signal-representing charge carriers toward the centers of said intersection regions for improved spatial resolution of said signal.

2. A liquid crystal light valve as set forth in claim 1 wherein:
   (a) said dielectric layer is silicon dioxide;
   (b) said semiconductor body is silicon; and
   (c) said means for applying a bias voltage across said light valve substrate is a set of electrodes, one adjacent said liquid crystal layer and one adjacent said semiconductor body.

3. A liquid crystal light valve adapted to be driven by a bias voltage alternating between two preselected levels and having a liquid crystal layer, a light valve substrate and interface means between said liquid crystal layer and said light valve substrate to reflect and inhibit the passage of light therethrough characterized in that said light valve substrate comprises:
   (a) a semiconductor body of predetermined thickness and a first conductivity type and a first impurity level;
   (b) a dielectric layer adjacent said semiconductor body and between said semiconductor body and said interface means;
   (c) means for applying a bias voltage alternating between two preselected levels across said light valve whereby said substrate is depleted of mobile charge carriers during a portion of the bias cycle whereby a charge depleted region and an electric field are established in said region through which signal charge carriers of a second conductivity type move across said substrate under the influence of said electric field; and
   (d) a microgrid structure in said semiconductor body comprised of a mesh of intersecting doped regions of said first conductivity type, each of said regions being of a second impurity level, said second level being greater than said first level so that, when said semiconductor body including said microgrid is depleted of mobile charge carriers of the first conductivity type, said intersecting regions forming said microgrid mesh provide a configuration of immobile charge of said second conductivity type to repel said signal representing charge carriers toward the centers of the cells comprising the microgrid to improve the spatial resolution of said light valve.

4. A liquid crystal light valve as set forth in claim 3 wherein:
   (a) said semiconductor body is silicon; and
   (b) said dielectric layer is silicon dioxide.

5. A photoactivated liquid crystal light valve adapted to be driven by a bias voltage alternating between two preselected leads for responding to applied information signals, said light valve comprising:
   (a) a semiconductor substrate of predetermined thickness a first conductivity type and a first impurity level having a first surface on which there is a microgrid of said first conductivity type and a second impurity level, said second level being greater than said first level, and a second surface which is exposed to incoming radiation;
   (b) a dielectric layer adjacent said first substrate surface;
   (c) means for applying across said light valve a bias voltage alternating between two preselected levels whereby said substrate is depleted of mobile charge carriers forming a charge depletion region and an electric field is established throughout said thickness of said substrate during a portion of the bias cycle so that signal representing charge carriers of a second conductivity type generated in said substrate in response to received radiation are transferred through said charge depletion region towards said dielectric layer;
   (d) a liquid crystal layer to receive the photoactivated signals; and
   (e) interface means between said liquid crystal layer and said dielectric layer to reflect and inhibit the passage of light therebetween.

6. A light valve as set forth in claim 5 wherein:
   (a) said semiconductor substrate is silicon; and (b) said dielectric layer is silicon dioxide and said silicon and silicon dioxide form in part an MOS type of structure.

7. A liquid crystal light valve adapted to be driven by a bias voltage alternating between two preselected levels for responding to applied information signals, said light valve comprising:
   (a) a silicon substrate of a first conductivity type and a first impurity level sensitive to incoming radiation;
   (b) a silicon dioxide layer adjacent to said substrate forming a MOS type of structure;
   (c) a liquid crystal layer;
   (d) interface means between said liquid crystal layer and said substrate for inhibiting the passage of light;
   (e) a microgrid formed in said substrate of a mesh of intersecting regions of said first conductivity type and a second impurity level, said second level being greater than said first level next to said silicon dioxide layer; and
   (f) means for applying a bias voltage alternating between two preselected levels across said light valve depleting said substrate and said microgrid of mobile charge carriers during a portion of the bias cycle whereby a charge depleted region and an electric field are established through which signal charge carriers of said first conductivity type generated in response to received radiation move under the influence of said field towards said silicone dioxide while said microgrid provides a configuration of immobile charge carriers of said second conductivity type to focus said signal charges of said second conductivity type for improved spatial resolution.

8. A CCD driven liquid crystal light valve adapted to be driven by a bias voltage alternating between two preselected levels with means for reading out the CCD signal and converting it to a voltage signal alternating between two preselected levels comprising:
   (a) a silicon substrate of a first conductivity type and first impurity level on a surface of which there is an epitaxial layer and on an opposed surface of which there is a silicon dioxide layer and in a portion of said substrate adjacent said silicon dioxide layer there is a microgrid of said first conductivity type and a second impurity level, said second level being greater than said first level;
   (b) a CCD structure on the top surface of said epitaxial layer;
   (c) liquid crystal interface layers adjacent said silicon dioxide layer;
   (d) a liquid crystal layer adjacent said interface layers;
   (e) a transparent electrode adjacent said liquid crystal layer; and
   (f) means for applying a bias voltage alternating between two preselected levels across said transparent electrode and said epitaxial layer whereby said silicon substrate and microgrid are fully depleted of charge carriers during a portion of the bias cycle creating a depletion region and an electric field that extends into a portion of said epitaxial layer so that signal representing charge carriers of a second conductivity type are transferred through said substrate under the influence of said electric field and the regions of immobile charge of said second conductivity type of said microgrid act as a focusing grid for the signal charge carriers.

* * * * *